(No Model.)
L. E. CHAPIN.
CULTIVATOR.
No. 329,888. Patented Nov. 10, 1885.
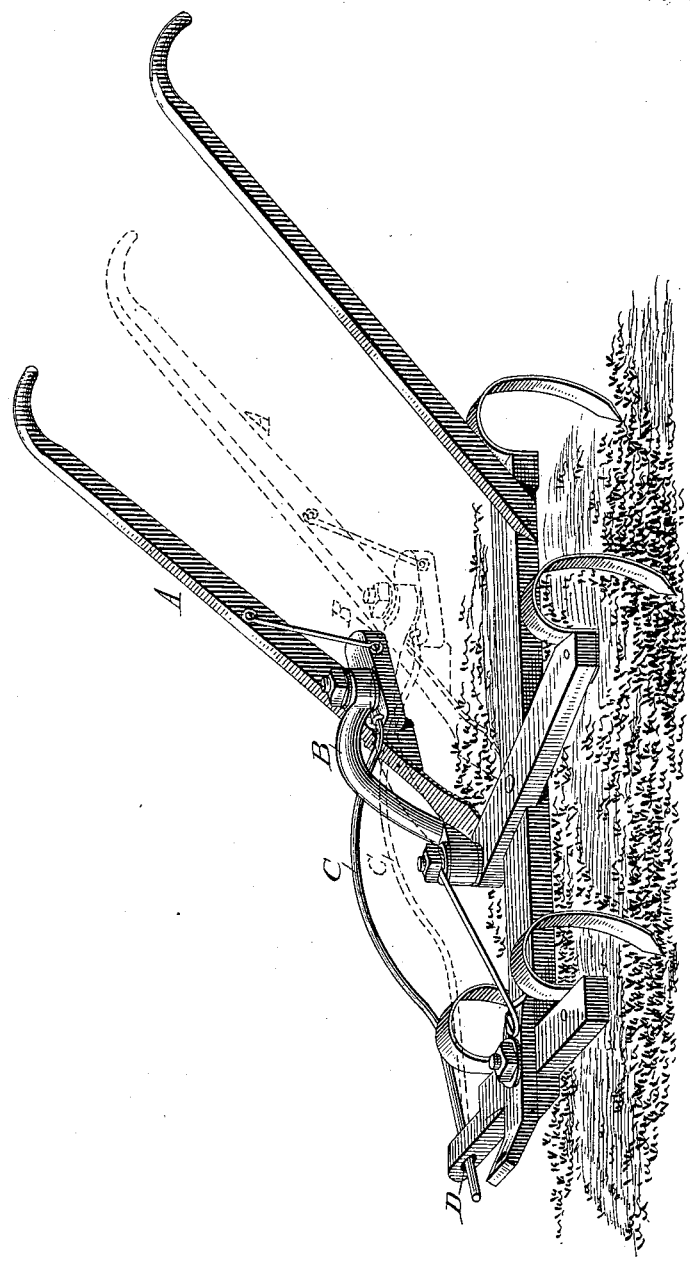
Witnesses:
L. A. Goodrich
L. N. Benedict
Inventor:
Lucius E. Chapin

UNITED STATES PATENT OFFICE.

LUCIUS E. CHAPIN, OF JEFFERSON, HILLSDALE COUNTY, MICHIGAN.

CULTIVATOR.

SPECIFICATION forming part of Letters Patent No. 329,838, dated November 10, 1885.

Application filed August 28, 1885. Serial No. 175,592. (No model.)

*To all whom it may concern:*

Be it known that I, LUCIUS E. CHAPIN, a citizen (born) of the United States, residing in the township of Jefferson, county of Hillsdale, and State of Michigan, have invented a new and useful Improvement in Corn-Cultivators, (for which I have obtained no patent in any foreign country,) of which the following is a specification.

The object of my invention is to make a corn-cultivator that will do more perfect work and be more easily controlled by the operator. I attain these objects by the use of a swinging tooth attached to the side of the cultivator in such a way that it can be moved toward or from the cultivator at the pleasure of the operator, of which the following is an accurate description.

A represents the handle, to which the swinging tooth is attached; B, the draft-bar, running from the cultivator to the handle A at an angle of about sixty-five degrees, and so attached that the tooth may easily swing to or from the cultivator. To the handle A is attached the arm C, the front end of which runs freely through an orifice at D, and serves to keep the face of the tooth forward.

Operation: If the cultivator is not running as close to the corn as desired, this loose or swinging tooth can be swung out as close to the corn as desired; or, if the cultivator is running too close and is going to cut the hill up, the loose tooth can be run around on the opposite side of the hill. When hills stand zig-zag in the row, the swinging tooth can be run with ease on either side of the hill, as may be desired, without moving the cultivator from the direct line of draft or out of the ground; hence the cultivator can be kept in the ground, doing full work all of the time.

What I claim, and desire to secure by Letters Patent, is—

The combination, with a cultivator, of the pivoted draft-bar B, swinging handle and tooth-standard A, and rod or arm C, substantially as shown and described.

LUCIUS E. CHAPIN.

Witnesses:
C. M. WEAVER,
C. A. SHEPARD.